United States Patent [19]
Bannister et al.

[11] 3,756,459
[45] Sept. 4, 1973

[54] METHOD AND APPARATUS FOR METERING FLUID UTILIZING PRESSURE DIFFERENTIALS

[75] Inventors: John D. Bannister; Andres Ferrari, Dover, Mass.

[73] Assignee: Damon Corporation, Needham Heights, Mass.

[22] Filed: Jan. 12, 1971

[21] Appl. No.: 105,804

[52] U.S. Cl................ 222/1, 23/253 R, 73/423 A, 128/2.05 F, 128/214 E, 222/389
[51] Int. Cl........................................... G01n 33/16
[58] Field of Search.................. 137/209, 564.5; 128/2.05 A, 2.05 M, 204, 214 F, 2.05 F, 214 E, DIG. 3, DIG. 13; 222/70, 203, 389, 400.5, 504, 394, 59, 71, 1; 23/253 R, 259; 73/423 R

[56] References Cited
UNITED STATES PATENTS

| | | | |
|---|---|---|---|
| 2,529,937 | 11/1950 | Hale | 222/40 |
| 2,756,906 | 7/1956 | Carter | 222/203 |
| 2,770,395 | 11/1956 | Sebardt | 222/23 |
| 2,835,252 | 5/1958 | Mauchel | 128/214 E |
| 3,471,262 | 10/1969 | Hrdina | 23/253 |

*Primary Examiner*—Robert B. Reeves
*Assistant Examiner*—Thomas E. Kocovsky
*Attorney*—Kenway, Jenney & Hildreth

[57] ABSTRACT

A method and apparatus for metering a second fluid contained in a pressure collapsible container having an outlet conduit. Means are provided for pressurizing a first fluid at substantially equal pressure on the outside surface of the container and in the conduit to prevent flow of second fluid in the conduit. Flow of second fluid is effected by reducing the pressure of the first fluid in the conduit.

18 Claims, 2 Drawing Figures

INVENTORS
JOHN D. BANNISTER
ANDRES FERRARI
BY
Kenway Jenney & Hildreth
ATTORNEYS

METHOD AND APPARATUS FOR METERING FLUID UTILIZING PRESSURE DIFFERENTIALS

This invention relates to a method and apparatus for metering fluids automatically and more particularly to a method and apparatus for metering fluids automatically in a process for continuously analyzing samples.

BACKGROUND OF THE INVENTION

In automatic chemical analysis processes, particularly when analyzing small samples, it is necessary to provide a means for continuously metering reagents to be reacted with the samples. In these processes, the reagent is removed from a storage area continuously in the form of a series of reagent samples and the sample to be analyzed and the reagent are mixed under reaction conditions either in a tray containing a plurality of sample cups or mixed in a tube and passed therethrough while the reaction is taking place. The reacted samples then are analyzed, as for example colorimetrically. Regardless of the system employed, it is essential that the reagent be metered in timed relation with the sample being directed to the sample-reagent mixing step so that the proper concentration of reagent is mixed with the sample to afford the desired chemical reaction and subsequent analysis. Otherwise, the sample either will be reacted incompletely or the reacted sample will be diluted with excess reagent. In either case, the subsequent analysis will be difficult or impossible since the analytical procedures usually are based upon a comparison of the reacted sample with a preselected known standard established by reacting the sample and reagent in a particular concentration range.

Some of the reagents employed in continuous chemical analysis techniques are corrosive and may cause damage to metering apparatus with which they contact. Thus, it would be highly desirable to provide a means for metering fluids whereby the fluid would not contact metering apparatus, such as valves, that can become clogged and rendered inoperative by reaction of the apparatus material with the reagent. Some of the reagents employed in continuous chemical analysis processes are corrosive and their use has necessitated frequent replacement of metering apparatus, with which they contact such as valves. Furthermore, in present processes it is difficult to change the relative concentrations of sample and reagent. Thus, the flexibility of present processes is materially limited since only samples having a volume within narrow limits can be processed. This limitation also renders it difficult to employ reagents other than those for which the analysis system was originally designed.

It is an object of the present invention to provide a fluid metering method and apparatus for dispensing measured quantities of fluid. It is another object of this invention to provide a fluid metering method and apparatus for dispensing a fluid whereby contact between the fluid and moving parts such as valves is prevented. It is a further object of this invention to provide a method and apparatus for metering fluids whereby the volume of metered fluid can be varied within a wide range. Further objects of this invention will be evident in view of the following detailed disclosure.

SUMMARY OF THE INVENTION

In accordance with the present invention, a fluid to be metered is stored in a pressure-collapsible container which in turn is located in a rigid housing. One or a plurality of conduits in parallel are connected to the interior of the collapsible container. Means are provided for applying fluid pressure to the outer surface of the collapsible cotainer and to each of the conduits at a point downstream of the collapsible container. When the pressure of the pressurizing fluid in the conduits and on the outside surface of the collapsible container are equalized, there is no fluid flow from the collapsible container. When fluid flow from the collapsible container is desired, the pressure of the pressurizing fluid in each of the conduits is reduced to less than the pressure on the outside surface of the collapsible container. The amount of fluid dispensed is regulated by regulating the time this pressure differential condition is maintained. When it is desired to cease fluid flow, the pressure of the pressurizing fluid in the conduit is raised so that it is substantially equal to the pressure on the outside of the collapsible container. There is no fluid flow upstream of where the pressurizing fluid is introduced into the conduit but there is fluid flow downstream of this point so that the pressurizing fluid acts to push the metered fluid downstream in and out of the conduit. The sequence for changing the pressure of the pressurizing fluid in the conduits can be regulated automatically to regulate automatically the timing and volume of fluid metered. Thus, an optical sensing means can be provided downstream of the point at which pressurizing fluid is introduced into the conduit which senses the interfaces of the fluid being metered and the pressurizing fluid which in turn is connected with a control means for admitting or preventing pressurizing fluid in the conduit. Alternatively, means for admitting or preventing pressurizing fluid into the conduit can be connected to a preset timing means that need not sense fluid flow.

BRIEF DESCRIPTION OF THE DRAWINGS

The present invention will be more fully described with reference to the accompany drawings.

DESCRIPTION OF SPECIFIC EMBODIMENTS

Figure 1:
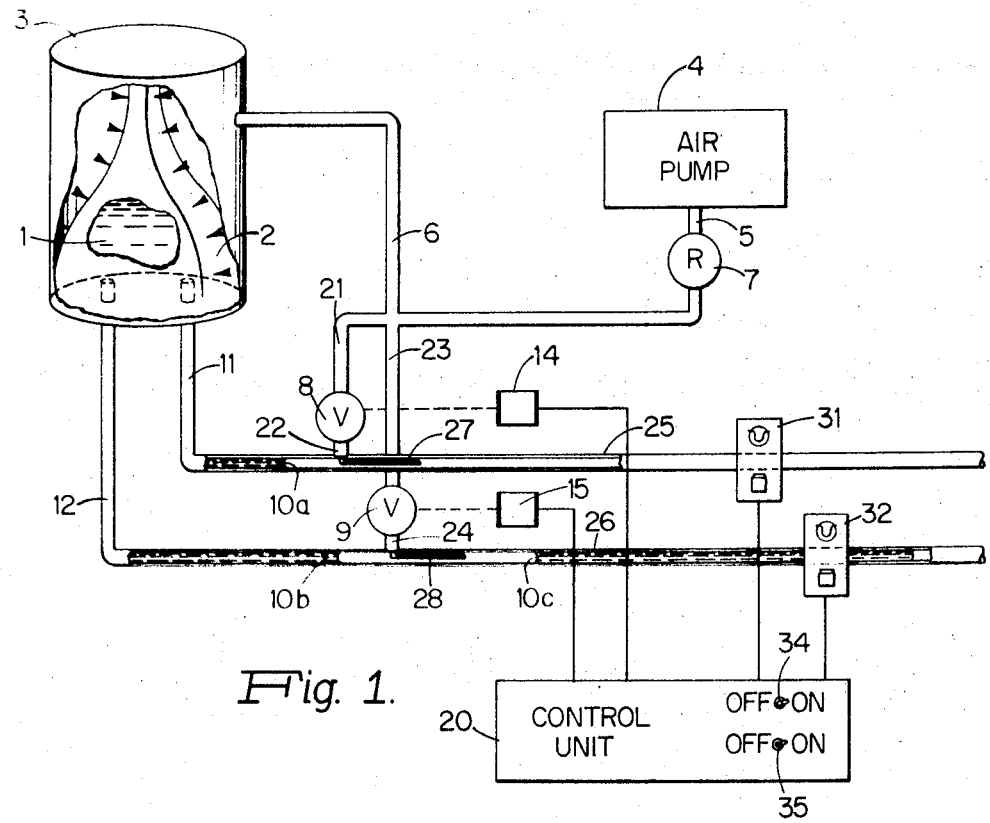
FIG. 1 is a diagrammatic view, in partial cross section, of a preferred form of the apparatus of this invention.

Referring now to FIG. 1, the fluid which is to be metered is indicated at 1 and is stored within a collapsible container 2 which is in turn housed in a rigid container 3. The collapsible container 2 is preferably in the form of a limp bag, e.g. of the type commonly used in an infant nurser. Container 2 is preferably attached to the inside top of the rigid container 3 so that little or no fluid will be trapped when the container 2 is collapsed by differential pressure as described hereinafter. The fluid held within collapsible container 2 can be drawn off through either of the pair conduits 11 and 12 which are in communication with the interior of the collapsible container 2, though not in communication with the space between the collapsible container 2 and the rigid container 3.

Pressurizing fluid, e.g. air, is provided by means of a pump operating through a regulator 7. The pressurizing fluid is applied continuously, through a conduit 6, to the space between the collapsible container 2 and the rigid container 3 and is selectively applied, through a conduit 21 and a valve 8, to a 'T' junction 22 with the conduit 11 and, through a conduit 23 and a valve 9, to a 'T' junction 24 with the conduit 12. While a simple 'T' junction may be used at 22 and 24 with most fluids, it has been found preferable in certain instances to utilize a small trailing coaxial section as indicated at 27 and 28 in certain instances. As it is explained in greater detail hereinafter, the valves 8 and 9 are normally open but are selectively closed during the metering operation itself by means of respective solenoids 14 and 15. Solenoids 14 and 15 are operated by a suitable control unit, indicated generally at 20.

Assuming that there is no significant static head, i.e. that the 'T' junctions 22 and 24 are as high or slightly higher than the fluid level in container 2, it will be seen that, when the valves 8 and 9 are open, there will be no pressure differential tending to drive the liquid 1 out through the conduits 11 and 12, though there will be venting of the pressurized air through the portions of the condujts, designated 25 and 26, which are downstream from the 'T' junctions 22 and 24. If, however, one of the valves, e.g. the valve 8, is closed by the operation of the respective solenoid, the pressure of the pressurizing fluid in the space between the collapsible container 2 and the rigid container 3, will cause the liquid 1 to be driven out through the conduit 11 and to flow downstream through the conduit portion 25 in place of the pressurizing fluid which vented through that conduit when the valve 8 was open. Energization of the solenoid 15 will likewise produce a flow of the liquid 1 through the conduit portion 26 in place of the venting pressurizing fluid. Since the pressurizing fluid flows continuously, whether or not fluid is being metered from the collapsible container 1, it can be seen that there is little tendency for the fluid being metered to move backward up the conduits 21 and 23 toward the valves 8 and 9, even if only a simple 'T' junction is used. As will be apparent, the pressurizing fluid and the fluid being metered should be immiscible. Assuming that this is the case, the collapsible container may be omitted in some instance, a free pressurizing fluid/metered fluid interface being present within the rigid container instead.

If desired, the amount of fluid metered can be controlled by merely timing the metering operation since the fluid rate of flow is relatively constant, being under a regulated pressure bias. However, a very precise increment or aliquot of the fluid to be metered may be obtained by means of optical detectors, as indicated at 31 and 32, which will respond to the passage of an interface between the fluid being metered and the pressurizing fluid. Each of these detectors is located downstream of the respective 'T' junction, with the spacing being such that the volume of the respective conduit (25 or 26) between the effective location of the 'T' junction and the photodetector 31 or 32 is exactly equal to the desired increment or aliquot to be metered. In this way, the desired aliquot of the fluid 1 may be obtained by closing the respective valve when the metered quantity is desired and then re-opening the valve when the leading edge of the fluid 1 reaches the respective optical detector. In this way, the quantity metered is caused to be exactly proportional to the separation between the photodetector and the point at which the 'T' junction introduces the pressurizing fluid into the respective conduit portion 25 or 26. This relationship holds even though the pressure of the pressurizing fluid at the 'T' junction is slightly higher than that applied to the space between the collapsible container 2 and the rigid conainer 3 so that the interface between the metered fluid and the pressurizing fluid adjacent the 'T' junction prior to closing the valve is pushed back somewhat toward the container, e.g. as indicated at 10a and 10b. This is because the re-introduction of the pressurizing fluid upon re-opening of the valve effectively immediately divides the stream at the effective location of the 'T' junction and continues to vent into the respective conduit 25 or 26 behind the metered aliquot. Such an interface with an exiting aliquot of liquid 1 is indicated at 10c. It may be noted that in the case of 'T' junctions having trailing portions as indicated at 27 and 28 i0 FIG. 1, the effective location of the 'T' junction will be at the point where the pressurizing fluid is actually released into the metering fluid conduit as opposed to the point of juncture of the external transverse conduit.

It may be noted that to completely terminate metering through one of the conduits, it is merely necessary to leave the respective valve 8 or 9 continuously open, since this prevents metering of the fluid. Control switches providing such an operation are indicated generally at 34 and 35 in the control unit 20.

Figure 2:
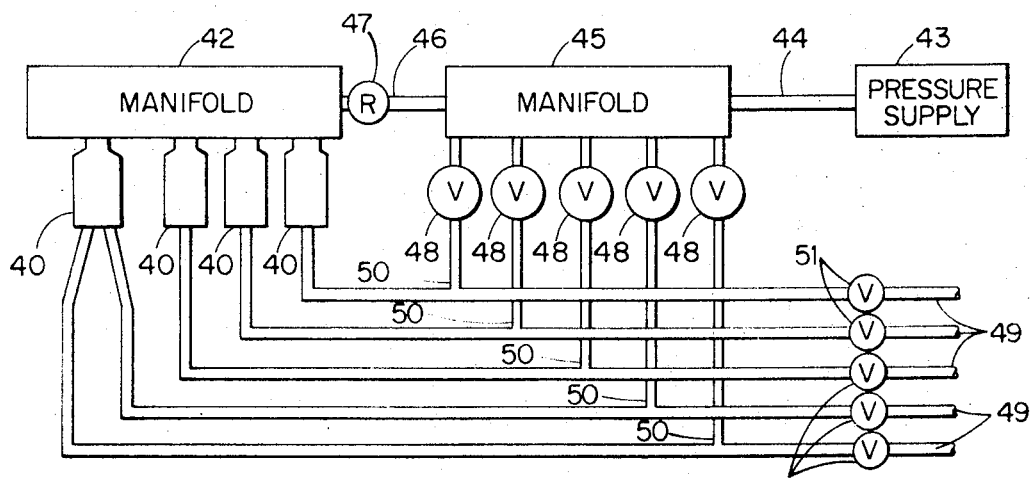
FIG. 2 is a schematic diagram of the apparatus wherein different fluids are metered simultaneously from a plurality of fluid storage means.

The embodiment of FIG. 2 incorporates means for more positively controlling the setback of the interface between the metered fluid and the pressurizing fluid from the 'T' junctions. In this embodiment, a plurality of 'T' junctions, indicated at 50, are selectively provided with pressurizing fluid through respective valves 48 which communicate with a manifold 45. A plurality of rigid containers 40 are employed, each housing a pressure collapsible container in the manner illustrated in greater detail in FIG. 1. Different fluids to be dispensed may be held within the various containers. In each container 40, the space between the collapsible and the rigid container is in communication with a manifold 42. A pressurizing fluid, e.g. air, is provided from supply 43 to manifold 45 at a pressure through a conduit 44. The pressurizing fluid is also provided to manifold 42 at a slightly lower pressure through a conduit 46 which includes a regulator as indicated at 47.

When the valves 48 are open, it will be seen that the higher pressure applied from the manifold 45 to the 'T' junctions 50 will cause the interfaces between the fluids being metered and the pressurizing fluid to be set back toward the respective containers 40 against the static head. As the amount of setback will necessarily depend upon the restriction presented to the venting pressurizing fluid by the outlet conduits, indicated at 49, the amount of setback in each case may be conveniently adjusted or equalized to some preselected value by means of respective adjustable constrictions, as indicated at 51. These constrictions can be empirically adjusted to provide the restriction required to achieve the desired setback in each case.

As noted previously, this metering apparatus is particularly adpated for use in automatic chemical analysis. Such an analysis system is described in the copending, commonly assigned application of D. I. Kosowsky, Andres Ferrari and Carl R. Hurtig for Constituents-Measuring Chemical Analyzer Having Multiple Concurrently-Operated Aliquote-Processing Conveyor being filed on the same day as the present application.

While the invention has been described with reference to the use of a common pressure source for the pressurizing fluid, it is to be understood that a plurality of pressure sources can be employed. Furthermore, when the pressurizing fluid is to be introduced into the outlet conduits, the pressure therein need not be exactly equal to that on the collapsible container. All that is necessary is that the pressure of the pressurizing fluid in the outlet conduits be sufficient to prevent leakage of the metered fluid past the point of introduction of the pressurizing fluid into the outlet conduit but less than that which will cause the pressurizing fluid to enter the collapsible container. As set forth above, this result can be attained readily by positioning the conduit between the container and pressure source taking into account the pressure drops in the conduits and the head of fluid in the collapsible container and outlet conduits.

The present invention is particularly adapted for use in continuous chemical analysis systems wherein a plurality of reagents are reacted simultaneously with a plurality of samples being analyzed. In particular, the present invention is particularly adapted for use in blood analysis wherein blood is analyzed simultaneously for a plurality of constituents such as albumin, creatinine, uric acid, bilirubin, glucose and the like wherein reagent compositions such as those containing sodium hydroxide, picric acid, phosphotungstic acid, neocuproine or sodium benzoate are employed. The reagents are supplied from the collapsible container as a series of metered aliquots separated by the pressurizing fluid to a mixing zone, not shown. In the mixing zone, each aliquot of reagent is mixed with a sample to effect the appropriate chemical analysis. The sample and reagent arrive at the mixing zone in timed relation so that only one aliquot of a reagent is admixed with each sample. In this embodiment, the valves for regulating delivery of pressurizing fluid to the outlet conduits can be operated by the optical sensing means described or can be responsive to timing means which in turn is adapted to be responsive to the rate of sample delivery to the mixing zone and adaoted to generate signals to operate these valves. Since the reagent fluid does not contact these valves or any other moving mechanism, the effects of corrosion can be eliminated merely by employing non-corrosive materials only for the outlet conduits and collapsible container. The system of this invention has the further advantage that the reagent does not contact air until metered and therefore will not be degraded by oxidation.

With reference to FIG. 1, another mode of operation may also be used when a stream of aliquots of fluid 1 separated by aliquots of pressurizing fluid is desired. A sensor such as optical sensor 31 responds to each interface as it passes the sensor; and each sensor signal causes the solenoid valve controlling the flow of pressurizing fluid to the upstream T-junction associated with the sensor interface to change position. Thus if a liquid-air interface first passes the sensor, indicating the valve 8 is closed, the signal from sensor 31 will cause the valve 8 to open. This in turn will cause the formation of an air-liquid interface which, when it reaches the sensor 31, will generate a signal causing closure of valve 8. This may be analogized to a free-running multivibrator in the electronic art. The result of such operation is the formation of a flowing stream of substantially equal volumes of the fluid 1 spearated by equal volumes of pressurizing fluid. The volume of any one "slug" of pressurizing fluid is not however necessarily equal to any one "slug" of metered fluid.

We claim:
1. Apparatus for metering fluids comprising a plurality of containers for housing a plurality of different fluids to be metered, means for pressurizing said fluids to be metered within said containers, a plurality of conduits leading from said containers for delivery of said fluids to be metered from said containers, means for introducing a pressurizing fluid into said conduits so as to contact the fluids to be metered and exert a pressure within each said conduit against the fluids to be metered to oppose the flow of said fluids to be metered through said conduits and means for varying the difference between the pressure within each said container and the pressure exerted by said pressurizing fluid within each conduit leading therefrom to controllably meter each said fluid to be metered through said conduits.

2. The apparatus of claim 1 wherein the containers comprise collapsible containers housed in rigid containers, said collapsible containers and said conduits being in communication.

3. Apparatus for dispensing a fluid, said apparatus comprising
a. a container for housing the fluid to be dispensed,
b. an outlet conduit in communication with said container and extending therefrom for delivering dispensed fluid,
c. a pressurizing conduit for a pressurizing fluid joining said outlet conduit at a junction, and
d. means for applying a pressurizing fluid under a substantially predetermined pressure to said container to cause said fluid to be dispensed to flow through said outlet conduit, means for introducing a pressurizing fluid under a substantially predetermined pressure into said pressurizing conduit to enable a pressurizing fluid to contact a fluid to be dispensed and exert a back pressure within said outlet conduit against a fluid to be dispensed while a fluid to be dispensed travels in said outlet conduit and means for selectively varying the pressure exerted by said pressurizing fluid in said pressurizing conduit joining said outlet conduit through said junction to enable controlled dispensing of said fluid to be dispensed.

4. The apparatus as set forth in claim 3 wherein said junction is a tee junction.

5. Apparatus for metering fluids comprising a container for housing a fluid to be metered, means for pressurizing said fluid to be metered within said container, a conduit leading from said container for the delivery of said fluid to be metered, means for introducing a pressurizing fluid into said conduit so as to contact the fluid to be metered and exert a back pressure within said conduit against said fluid to be metered to oppose the flow of said fluid to be metered through said conduit, and means for controllably varying the difference between the pressure within the container and the pressure exerted by the pressurizing fluid within said conduit to controllably meter said fluid to be metered through said conduit.

6. The apparatus as set forth in claim 5 further comprising automatic sensing means for monitoring fluid flow in said conduit and actuating said means for controllably varying the difference between said pressures.

7. The apparatus of claim 6 wherein said automatic sensing means comprises means for sensing an interface between said fluid to be metered and said pressurizing fluid within the conduit either to increase or decrease the pressure of said pressurizing fluid in said conduit.

8. Apparatus for dispensing a liquid, said apparatus comprising:
   a. a substantially rigid container,
   b. a collapsible container within said rigid container for housing the liquid to be dispensed,
   c. an outlet conduit in communication with said collapsible container and extending therefrom for delivering dispensed liquid,
   d. means for applying a pressurizing fluid to a space between said substantially rigid container and said collapsible container at a substantially predetermined pressure to cause said liquid to be dispensed to flow through said outlet conduit,
   e. a pressurizing fluid conduit joining said outlet conduit at a junction,
   f. means for introducing a pressurizing fluid under a substantially predetermined pressure into said pressurizing conduit to enable a pressurizing fluid to contact a fluid to be dispensed and exert a back pressure within said outlet conduit against a fluid to be dispensed while a fluid to be dispensed travels in said outlet conduit, and
   g. means, including a valve, for selectively venting a pressurizing fluid at a source pressure at least equal to said predetermined pressure, through said junction.

9. Apparatus as set forth in claim 8 including means for providing an adjustabe flow restriction in said outlet conduit downstream of said junction for adjustment of back pressure during said venting.

10. The apparatus as set forth in claim 8 wherein said junction is a tee junction.

11. A method for metering fluids from a container having a conduit leading from the container for the delivery of fluids to be metered comprising the steps of:
   a. introducing a fluid to be metered into said container,
   b. providing means for pressurizing said fluid to be metered while in said container,
   c. providing means for introducing a pressurizing fluid into said conduit for exerting a back pressure within said conduit with a pressurizing fluid which is substantially immiscible with the fluid to be metered and which contacts the fluid to be metered as it travels in said conduit, the back pressure of said pressurizing fluid enabling a controllable opposition to the flow of said fluid to be metered through said conduit,
   d. thereafter, causing the pressure within the container to be greater than the pressure exerted by said pressurizing fluid against said fluid to be metered within said conduit to produce a flow of said fluid to be metered through said conduit, and
   e. causing said pressurizing fluid to contact the fluid to be metered within said conduit and exert a sufficient pressure against said fluid to be metered flowing through said conduit to stop the flow of fluid to be metered after the desired amount of fluid to be metered has flowed past the point in said conduit at which said pressurizing fluid is introduced into said conduit.

12. The method of claim 11 wherein said pressurizing fluid is introduced simultaneously into a plurality of conduits, each conduit being associated with a separate container.

13. The method of claim 11 wherein a plurality of conduits communicate with said contiainer.

14. The method of claim 11 wherein said pressurizing fluid is introduced into said conduit intermittently and automatically to meter said fluid to be metered as a plurality of aliquots.

15. The method of claim 14 wherein an interface of an aliquot between said fluid to be metered and said pressurizing fluid is sensed by a sensing element which, in conjunction with a signal generator, generates a signal to increase the pressure of said pressurizing fluid to prevent flow of said fluid to be metered from said container and a second interface of said aliquot is sensed by a sensing element which, in conjunction with a signal generator, generates a signal to decrease the pressure of said pressurizing fluid to allow flow of said fluid to be metered from said container.

16. The method of claim 14 wherein said aliquots are directed to a mixing zone to be admixed each with one sample to be analyzed.

17. The method of claim 14 wherein said aliquots are directed to a mixing zone to be admixed each with a blood sample to be analyzed.

18. The method of claim 14 wherein the fluid to be metered is introduced into a collapsible container which is housed in a rigid container.

* * * * *